United States Patent
Yang

(10) Patent No.: US 8,441,431 B2
(45) Date of Patent: May 14, 2013

(54) BACKLIGHT UNIT AND LIQUID CRYSTAL DISPLAY USING THE SAME

(75) Inventor: Yeunhyeok Yang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 345 days.

(21) Appl. No.: 12/967,763

(22) Filed: Dec. 14, 2010

(65) Prior Publication Data

US 2011/0149187 A1    Jun. 23, 2011

(30) Foreign Application Priority Data

Dec. 22, 2009   (KR) .................. 10-2009-0129153

(51) Int. Cl.
G09G 3/36           (2006.01)
(52) U.S. Cl.
USPC ........................................................ 345/102
(58) Field of Classification Search .................. 345/102
See application file for complete search history.

(56) References Cited

U.S. PATENT DOCUMENTS

| | | | |
|---|---|---|---|
| 7,307,614 B2 * | 12/2007 | Vinn | 345/102 |
| 2007/0109253 A1 * | 5/2007 | Zhou et al. | 345/102 |
| 2008/0136771 A1 * | 6/2008 | Chen et al. | 345/102 |

* cited by examiner

*Primary Examiner* — Kevin M Nguyen
(74) *Attorney, Agent, or Firm* — Brinks Hofer Gilson & Lione

(57) ABSTRACT

A liquid crystal display includes a liquid crystal display panel and a backlight unit. The backlight unit includes a first transistor generating a power voltage supplied through a power line as a driving current based on a driving voltage supplied to a gate electrode of the first transistor, a light emitting element emitting light by the first transistor, a second transistor connected to the first transistor in a current mirror form, a capacitor storing, and at least two switching transistors that equally respond to a selection signal supplied through a selection line and form the same discharge path, so that the power voltage supplied through the power line is sunk to a constant current unit and the driving voltage is stored in the capacitor.

16 Claims, 7 Drawing Sheets

BACKLIGHT UNIT AND LIQUID CRYSTAL DISPLAY USING THE SAME

This application claims the benefit of the Patent Korean Application No. 10-2009-0129153, filed on Dec. 22, 2009, which is hereby incorporated by reference as if fully set forth herein.

BACKGROUND

1. Field of the Invention

Exemplary embodiments of the disclosure relate to a backlight unit and a liquid crystal display using the same.

2. Discussion of the Related Art

As the information technology is developed, the market for display devices used as connection mediums between users and information is growing. Accordingly, the use of flat panel displays (FPDs) such as a liquid crystal display (LCD), an organic light emitting diode (OLED) display, and a plasma display panel (PDP) is increasing. The liquid crystal displays have been widely used because they can implement a high resolution and can achieve both the small-sized screen and the large-sized screen.

The liquid crystal display includes a transistor substrate, on which thin film transistors, storage capacitors, pixel electrodes, etc. are formed, a color filter substrate on which color filters, black matrixes, etc. are formed, and a liquid crystal layer positioned between the transistor substrate and the color filter substrate. The liquid crystal display adjusts an arrangement direction of the liquid crystal layer by an electric field generated between the pixel electrodes and common electrodes on the transistor substrate or the color filter substrate, thereby displaying an image using light coming from a backlight unit.

Some of related art liquid crystal displays have adopted a backlight unit that drives a light emitting element using a current mirror circuit. In the related art current mirror type backlight unit, when a selection signal is turned off not to drive the light emitting element, a discharge path is not formed. Hence, a voltage of a drain electrode and a voltage of a gate electrode simultaneously increase. As a result, a current flowing in the light emitting element is reduced. A solution for the current reduction is required.

BRIEF SUMMARY

In one aspect, there is a liquid crystal display comprising a liquid crystal display panel and a backlight unit configured to provide light to the liquid crystal display panel, wherein the backlight unit includes a first transistor configured to generate a power voltage supplied through a power line as a driving current based on a driving voltage supplied to a gate electrode of the first transistor, a light emitting element configured to emit light by the first transistor, a second transistor connected to the first transistor in a current mirror form, a capacitor configured to store the driving voltage, one terminal of the capacitor being connected to the power line, and the other terminal of the capacitor being connected between gate electrodes of the first and second transistors, and at least two switching transistors configured to equally respond to a selection signal supplied through a selection line and form the same discharge path, so that the power voltage supplied through the power line is sunk to a constant current unit and the driving voltage is stored in the capacitor.

In another aspect, there is a backlight unit comprising a light source unit including a light emitting element emitting light by the first transistor that generates a power voltage supplied through a power line as a driving current based on a driving voltage supplied to a gate electrode of the first transistor, a second transistor connected to the first transistor in a current mirror form, a capacitor configured to store the driving voltage, one terminal of the capacitor being connected to the power line, and the other terminal of the capacitor being connected between gate electrodes of the first and second transistors, and at least two switching transistors configured to equally respond to a selection signal supplied through a selection line and form the same discharge path, so that the power voltage supplied through the power line is sunk to a constant current unit and the driving voltage is stored in the capacitor.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Reference will now be made in detail embodiments of the invention examples of which are illustrated in the accompanying drawings.

Figure 1:
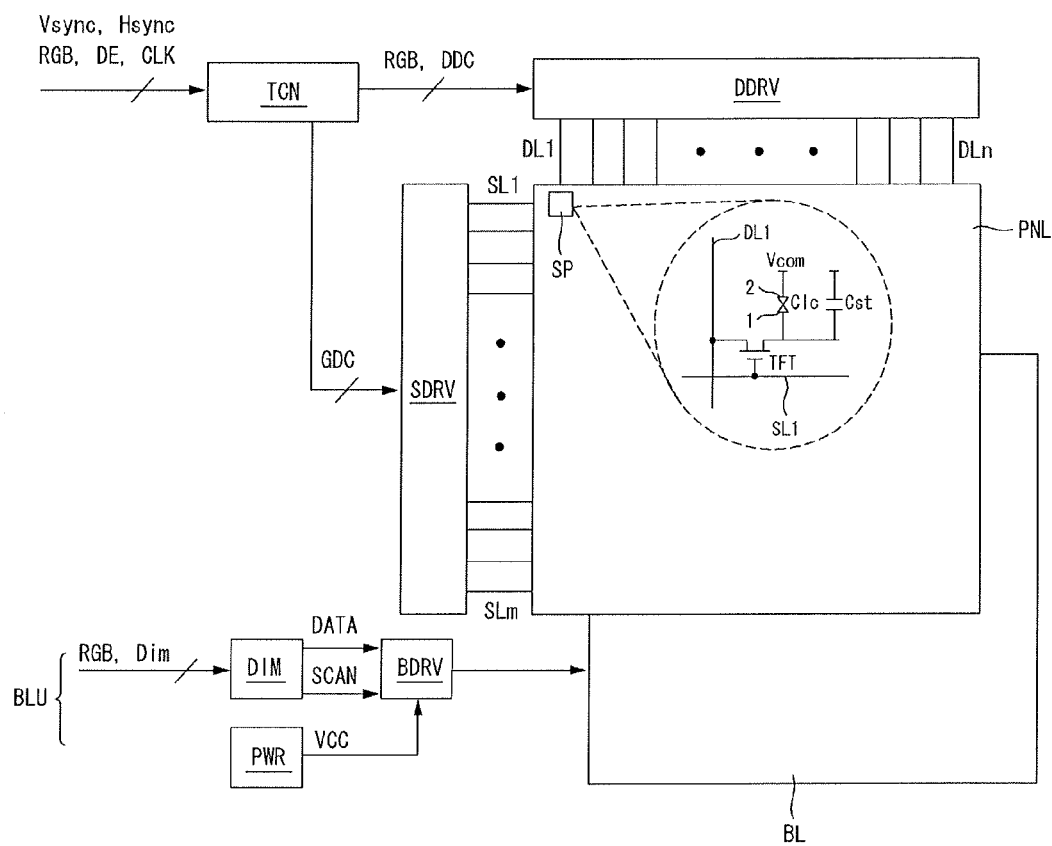
FIG. 1 is a block diagram of a liquid crystal display according to an exemplary embodiment of the invention.
Figure 2:
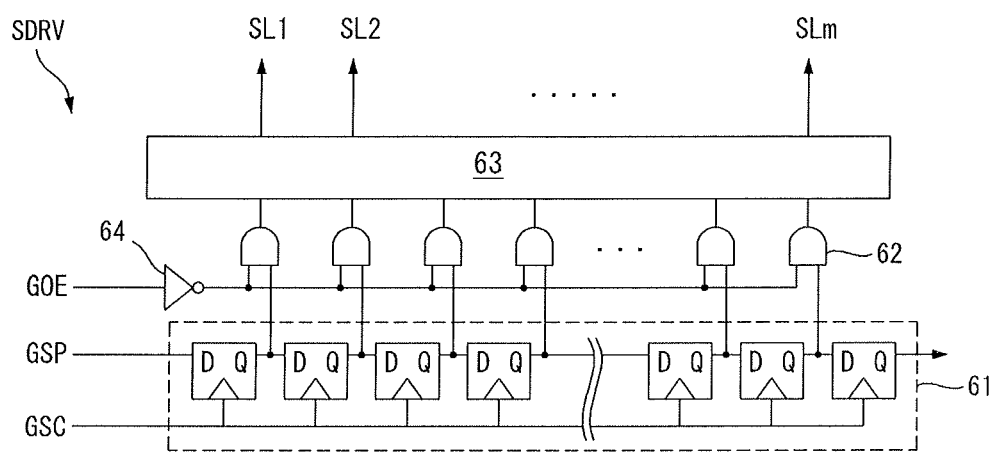
FIG. 2 is a block diagram of a gate driver.
Figure 3:
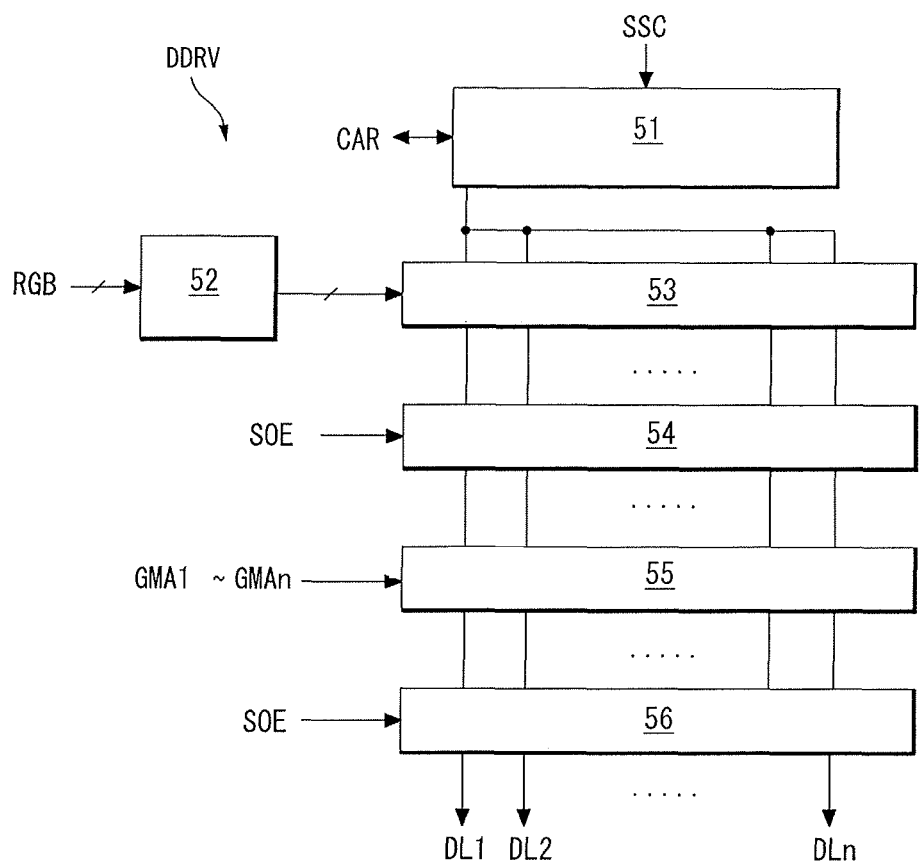
FIG. 3 is a block diagram of a data driver.
Figure 4:
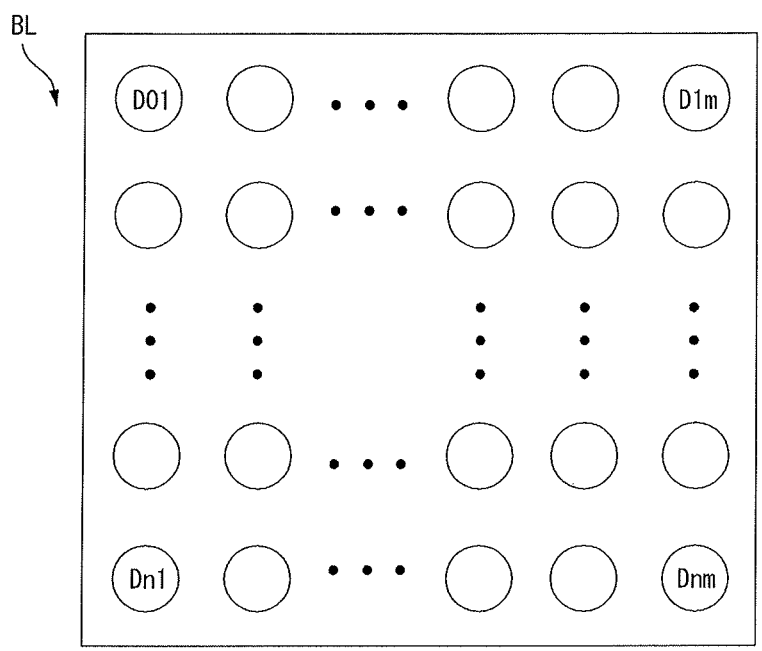
FIG. 4 is an arrangement plan of light emitting elements.

FIG. 1 is a block diagram of a liquid crystal display according to an exemplary embodiment of the invention. FIG. 2 is a block diagram of a gate driver. FIG. 3 is a block diagram of a data driver. FIG. 4 is an arrangement plan of light emitting elements.

As shown in FIG. 1, a liquid crystal display according to an exemplary embodiment of the invention includes a timing driver TCN, a liquid crystal display panel PNL, a gate driver SDRV, a data driver DDRV, and a backlight unit BLU.

The timing driver TCN receives a vertical synchronous signal Vsync, a horizontal synchronous signal Hsync, a data enable signal DE, a clock CLK, and an image signal RGB from an external source. The timing driver TCN controls an operation timing of the data driver DDRV and an operation timing of the gate driver SDRV using timing signals such as the vertical synchronous signal Vsync, the horizontal synchronous signal Hsync, the data enable signal DE, and the clock signal CLK. In this case, because the timing driver TCN can determine a frame period by counting the data enable signal DE during one horizontal period, the vertical synchronous signal Vsync and the horizontal synchronous signal Hsync may be omitted. Control signals generated by the timing driver TCN may include a gate timing control signal GDC for controlling the operation timing of the gate driver SDRV and a data timing control signal DDC for controlling the operation timing of the data driver DDRV. The gate timing control signal GDC includes a gate start pulse GSP, a gate shift clock GSC, a gate output enable signal GOE, and the like. The gate start pulse GSP is supplied to a gate driver integrated circuit (IC) generating a first gate signal. The gate shift clock GSC is commonly inputted to a plurality of gate driver ICs and is used to shift the gate start pulse GSP. The gate output enable signal GOE controls outputs of the gate driver ICs. The data timing control signal DDC includes a source start pulse SSP, a source sampling clock SSC, a source output enable signal SOE, and the like. The source start pulse SSP controls a sampling start time point of data of the data driver DDRV. The source sampling clock SSC controls a sampling operation of data inside the data driver DDRV based on its rising or falling edge. The source output enable signal SOE controls an output of the data driver DDRV. The source start pulse SSP supplied to the data driver DDRV may be omitted according to a data transfer method.

The gate driver SDRV sequentially generates a gate signal in response to the gate timing control signal GDC received from the timing driver TCN while shifting a level of the gate signal to a swing width of a gate voltage capable of operating transistors of subpixels SP included in the liquid crystal display panel PNL. The gate driver SDRV supplies the gate signal generated through gate lines SL1 to SLm to the subpixels SP of the liquid crystal display panel PNL. As shown in FIG. 2, the gate driver SDRV includes a plurality of gate driver ICs. Each of the plurality of gate driver ICs includes a shift register 61, a level shifter 63, a plurality of AND gates 62 connected between the shift register 61 and the level shifter 63, an inverter 64 for inverting the gate output enable signal GOE, and the like. The shift register 61 sequentially shifts the gate start pulse GSP in response to the gate shift clock GSC using a plurality of cascade-connected D-flip flops. Each of the AND gates 62 performs an AND operation on an output signal of the shift register 61 and an inversion signal of the gate output enable signal GOE to generate an output. The inverter 64 inverts the gate output enable signal GOE and supplies the inverted signal of the gate output enable signal GOE to the AND gates 62. The level shifter 63 shifts a swing width of an output voltage of the AND gates 62 to the swing width of the gate voltage capable of operating the transistors of the liquid crystal display panel PNL. The gate signal output from the level shifter 63 is sequentially supplied to the gate lines SL1 to SLm.

The data driver DDRV samples and latches the image signal RGB received from the timing driver TCN in response to the data timing control signal DDC received from the timing driver TCN and converts the latched image signal RGB into parallel data. When the data driver DDRV converts the image signal RGB into the parallel data, the data driver DDRV converts the image signal RGB into a gamma reference voltage. The data driver DDRV supplies the converted image signal RGB to the subpixels SP of the liquid crystal display panel PNL through data lines DL1 to DLn. As shown in FIG. 3, the data driver DDRV includes a plurality of data driver ICs. Each of the plurality of data driver ICs includes a shift register 51, a data register 52, a first latch 53, a second latch 54, a converter 55, an output circuit 56, and the like. The shift register 51 shifts the source sampling clock SSC received from the timing driver TCN. For example, the shift register 51 of one data driver IC transfers a carry signal CAR to the shift register 51 of a next data driver IC. The data register 52 temporarily stores the image signal RGB received from the timing driver TCN and supplies it to the first latch 53. The first latch 53 samples and latches the serially input image signal RGB in response to a clock sequentially received from the shift register 51. The first latch 53 then simultaneously outputs the latched image signal RGB. The second latch 54 latches the data received from the first latch 53 and then simultaneously outputs the latched data in synchronization with second latches 54 of other source drives ICs in response to the source output enable signal SOE. The converter 55 converts the image signal RGB received from the second latch 54 into gamma reference voltages GMA1 to GMAn. The image signal RGB output from the output circuit 56 is supplied to the data lines DL1 to DLn in response to the source output enable signal SOE.

The liquid crystal display panel PNL includes a thin film transistor (TFT) substrate, a color filter substrate, a liquid crystal layer between the TFT substrate and the color filter substrate, the plurality of subpixels SP arranged in a matrix form. The data lines DL1 to DLn, the gate lines SL1 to SLm, thin film transistors (TFTs), storage capacitors Cst, and the like are formed on the TFT substrate. A black matrix, a color filter, and the like are formed on the color filter substrate. For example, one subpixel SP is defined by the data line DL1 and the gate line SL1 crossing each other. Each of the plurality of subpixels SP includes the TFT driven by the gate signal supplied through the gate line SL1, the storage capacitor Cst for storing the image signal RGB supplied through the data line DL1 as a data voltage, a liquid crystal cell Clc driven by the data voltage stored in the storage capacitor Cst. The liquid crystal cell Clc is driven by the data voltage supplied to a pixel electrode 1 and a common voltage Vcom supplied to a common electrode 2. In a vertical electric field drive manner such as a twisted nematic (TN) mode and a vertical alignment (VA) mode, the common electrode 2 is formed on the color filter substrate. In a horizontal electric field drive manner such as an in-plane switching (IPS) mode and a fringe field switching (FFS) mode, the common electrode 2 is formed on the TFT substrate along with the pixel electrode 1. Polarizing plates are respectively attached to the TFT substrate and the color filter substrate of the liquid crystal display panel PNL. Alignment layers for setting a pre-tilt angle of liquid crystals are respectively formed on the TFT substrate and the color filter substrate. The liquid crystal display panel PNL applicable to the embodiment of the invention may be implemented in any liquid crystal mode as well as the TN, VA, IPS, and FFS modes.

The backlight unit BLU provides light to the liquid crystal display panel PNL. The backlight unit BLU includes a diming controller DIM, a power supply unit PWR, a light source driver BDRV, and a light source unit BL. The diming controller DIM receives the image signal RGB and a global diming signal Dim from the timing driver TCN or an external system board. The diming controller DIM analyzes an image depending on each location of the light source unit BL based on an image displayed on the liquid crystal display panel PNL and obtains a local diming value based on the result of an analysis. The diming controller DIM generates a data signal and a scan signal depending on the local diming value and supplies the data signal and the scan signal to the light source driver BDRV through a signal line DATA and a selection line SCAN. The power supply unit PWR converts an external power received from the outside into a DC power and supplies the DC power to the light source driver BDRV through a power line VCC. The light source driver BDRV drives the light source unit BL using the data signal and the scan signal received from the diming controller DIM. The light source unit BL includes a plurality of light emitting elements so that the light source unit BL provides light to a lower part of the liquid crystal display panel PNL. As shown in FIG. 4; the light source unit BL may include a plurality of light emitting elements D01 to Dnm that are positioned on the plane to be spaced apart from one another at a constant distance in a regular point form. The plurality of light emitting elements D01 to Dnm may be non-uniformly arranged.

The backlight unit BLU according to the exemplary embodiment of the invention is described in detail below.

Figure 5:
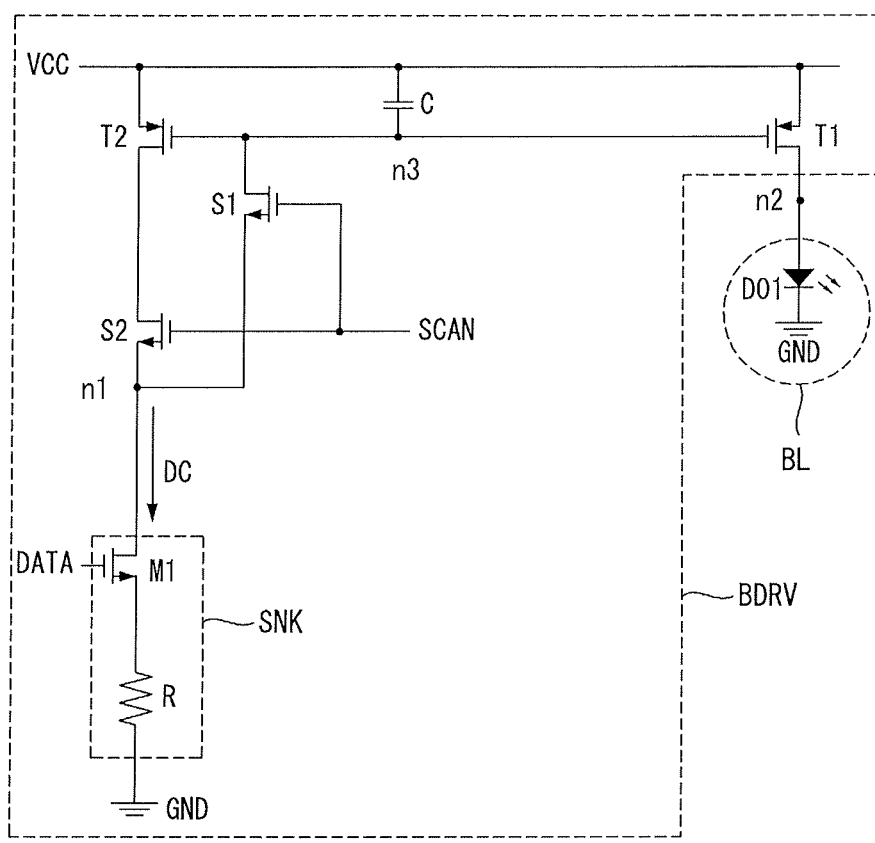
FIG. 5 is a circuit diagram schematically illustrating a portion of a backlight unit according to an exemplary embodiment of the invention.
Figure 6:
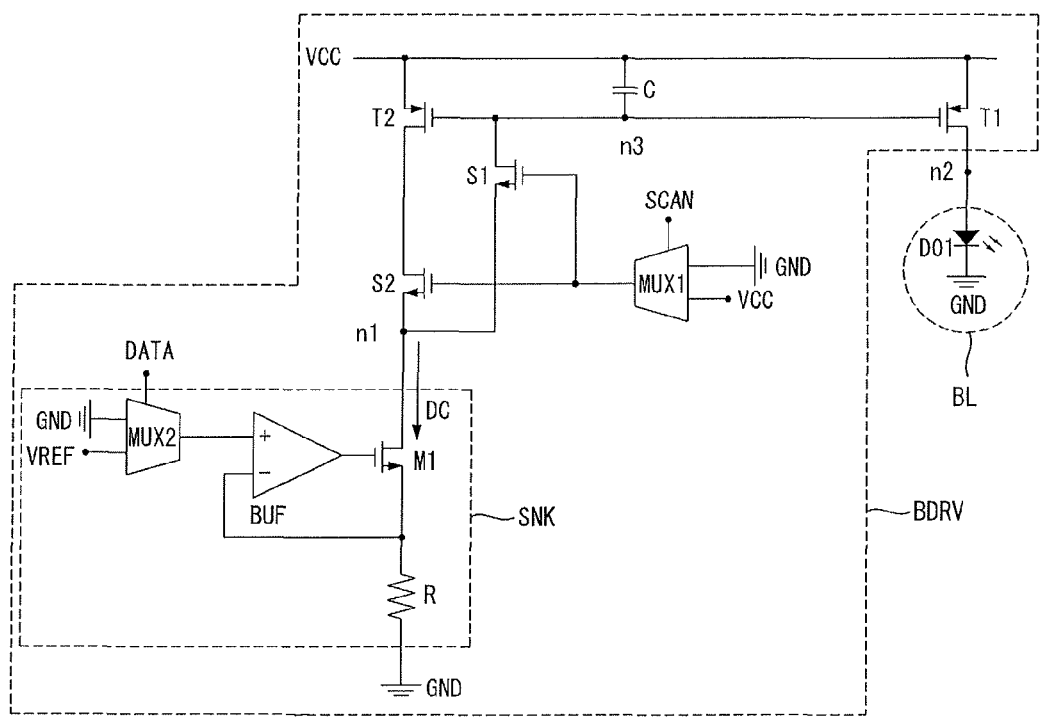
FIG. 6 is a circuit diagram illustrating in detail a portion of the backlight unit shown in FIG. 5.
Figure 7:
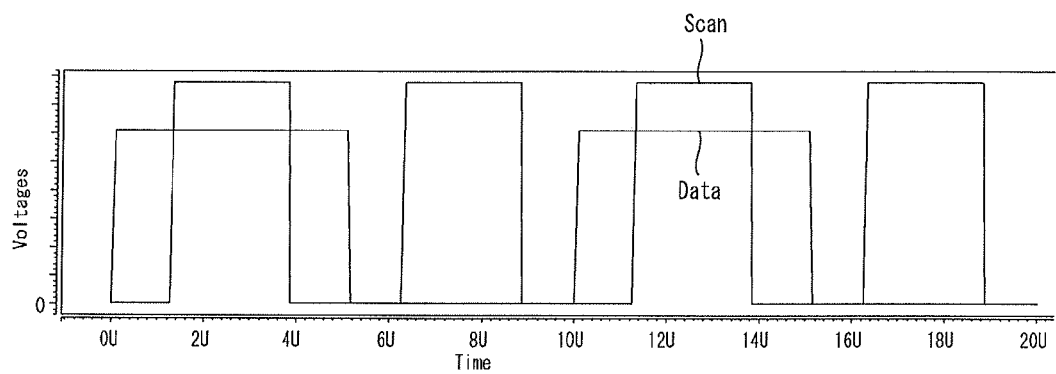
FIG. 7 is a waveform diagram of a drive of a backlight unit according to an exemplary embodiment of the invention.
Figure 8:
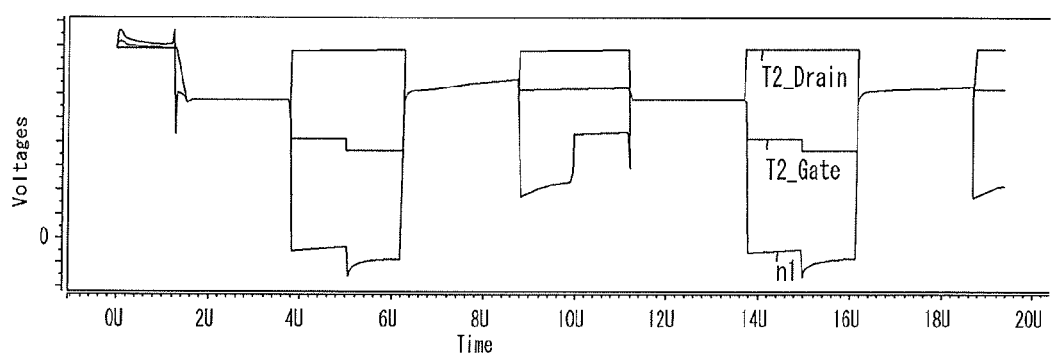
FIG. 8 is a waveform diagram of voltages of a drain electrode and a gate electrode of a second transistor depending on a driving waveform of the backlight unit shown in FIG. 7.

FIG. 5 is a circuit diagram schematically illustrating a portion of the backlight unit according to the exemplary embodiment of the invention. FIG. 6 is a circuit diagram illustrating in detail a portion of the backlight unit shown in FIG. 5. FIG. 7 is a waveform diagram of a drive of the backlight unit. FIG. 8 is a waveform diagram of voltages of a drain electrode and a gate electrode of a second transistor depending on a driving waveform of the backlight unit shown in FIG. 7.

As shown in FIG. 5, the light source driver BDRV includes a first transistor T1, a second transistor T2, a capacitor C, first and second switching transistors S1 and S2, and a constant current unit SNK. The light source unit BL includes a light emitting element D01 that emits light by the first transistor T1.

The first transistor T1 generates a driving current using a power voltage supplied through the power line VCC based on a driving voltage supplied to a gate electrode of the first transistor T1. The second transistor T2 is connected to the first transistor T1 in a current mirror form. The capacitor C stores the driving voltage. One terminal of the capacitor C is connected to the power line VCC, and the other terminal is connected between gate electrodes of the first and second transistors T1 and T2. The first and second switching transistors S1 and S2 equally respond to a selection signal supplied through the selection line SCAN and form the same discharge path DC, so that the power voltage supplied through the power line VCC is sunk to the constant current unit SNK and the driving voltage is stored in the capacitor C. The constant current unit SNK includes a control transistor M1, which sinks the power voltage supplied through the power line VCC in response to the data signal supplied through the signal line DATA, and a resistor R.

A connection relationship between the light source driver BDRV and the light source unit BL is described below.

The gate electrode of the first transistor T1 is connected to the other terminal of the capacitor C, a first electrode of the first transistor T1 is connected to the power line VCC, and a second electrode of the first transistor T1 is connected to an anode electrode of the light emitting element D01. A gate electrode of the second transistor T2 is connected to the other terminal of the capacitor C, a first electrode of the second transistor T2 is connected the to the power line VCC, and a second electrode of the second transistor T2 is connected to a first electrode of the second switching transistor S2. Hence, the gate electrodes of the first and second transistors T1 and T2 are commonly connected to a third node n3, and the first electrodes of the first and second transistors T1 and T2 are commonly connected to the power line VCC. As a result, the first and second transistors T1 and T2 are connected to each other in the current mirror form. In the exemplary embodiment of the invention, the first and second transistors T1 and T2 may be implemented as a PMOS transistor. Other types of transistors may be used.

The anode electrode of the light emitting element D01 is connected to the second electrode of the first transistor T1, and a cathode electrode of the light emitting element D01 is connected to a ground level line GND. The light emitting element D01 may be implemented as a light emitting diode. Other kinds of elements may be used.

A gate electrode of the first switching transistor S1 is connected to the selection line SCAN, a first electrode of the first switching transistor S1 is connected to the third node n3 connected to the gate electrodes of the first and second transistors T1 and T2, and a second electrode of the first switching transistor S1 is connected to a first node n1 connected to the constant current unit SNK. A gate electrode of the second switching transistor S2 is connected to the selection line SCAN, a first electrode of the second switching transistor S2 is connected to the second electrode of the second transistor T2, and a second electrode of the second switching transistor S2 is connected to the first node n1. In the exemplary embodiment of the invention, the first and second switching transistors S1 and S2 may be implemented as an NMOS transistor. Other types of transistors may be used.

A gate electrode of the control transistor M1 included in the constant current unit SNK is connected to the signal line DATA, a first electrode of the control transistor M1 is connected to the first node n1, and a second electrode of the control transistor M1 is connected to the resistor R. One terminal of the resistor R included in the constant current unit SNK is connected to the control transistor M1, and the other terminal of the resistor R is connected to the ground level line GND.

As shown in FIG. 6, the selection signal supplied through the selection line SCAN may be supplied to a first mux MUX1. Hence, the selection signal may be configured to select one among voltages supplied through the power line VCC or the ground level line GND. Other voltages may be selected. The data signal supplied through the signal line DATA may be supplied to a second mux MUX2. In this case, the data signal may be configured to select one among voltages supplied through a reference voltage line VREF or the ground level line GND. Other voltages may be selected. As described above, the constant current unit SNK may further include the second mux MUX2 and a buffer BUF in addition to the control transistor M1 and the resistor R1, but is not limited thereto. The buffer BUF may be connected to the gate electrode and the second electrode of the control transistor M1 so that the buffer BUF drives the control transistor M1 based on a voltage output from the second mux MUX2 and controls an amount of sink current, but is not limited thereto.

In the exemplary embodiment of the invention, the first electrode and the second electrode of each of the transistors T1, T2, S1, S2, and M1 respectively indicate a source electrode and a drain electrode. Alternatively, the first electrode and the second electrode of each of the transistors T1, T2, S1, S2, and M1 may respectively indicate a drain electrode and a source electrode. The first transistor T1 may be included in the light source unit BL in accordance with a circuit configuration.

A data signal Data and a selection signal Scan supplied through the signal line DATA and the selection line SCAN may be represented as shown in FIG. 7. In this case, the light source driver BDRV and the light source unit BL operate as follows.

When the selection signal Scan of a high logic level is supplied, the first and second switching transistors S1 and S2 equally respond and are turned on. Hence, the second transistor T2 is turned on, and the control transistor M1 sinks a current supplied through the power line VCC so as to correspond to the data signal Data. In this case, the capacitor C stores the power voltage supplied through the power line VCC as the driving voltage so as to correspond to a sink current by the control transistor M1. Subsequently, when the selection signal Scan of a low logic level is supplied, the first and second switching transistors S1 and S2 are turned off. Hence, the first transistor T1 generates the driving current corresponding to the driving voltage stored in the capacitor C and the light emitting element D01 emits light based on the driving current.

As described above, the first and second switching transistors S1 and S2 are connected to each other so as to form the same discharge path DC. Accordingly, the first switching transistor S1 can be easily discharged to the ground level line GND irrespective of the turn-on or turn-on operation of the second switching transistor S2 in the above-described driving process. Further, as shown in FIG. 8, because a simultaneous increase in voltages of a second electrode T2_Drain and a gate electrode T2_Gate of the second transistor T2 can be prevented, a current flowing through the light emitting element D01 can be stably maintained. In FIG. 8, "n1" indicates a waveform of a voltage of the first node.

As described above, the exemplary embodiment of the invention can provide the current-mirror type backlight unit, which is capable of stably maintaining the current supplied to the light emitting element so as to increase the display quality of the liquid crystal display panel, and the liquid crystal display including the same.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A liquid crystal display comprising:
a liquid crystal display panel; and
a backlight unit configured to provide light to the liquid crystal display panel, the backlight unit including:
a first transistor configured to generate a power voltage supplied through a power line as a driving current based on a driving voltage supplied to a gate electrode of the first transistor;
a light emitting element configured to emit light by the first transistor;
a second transistor connected to the first transistor in a current mirror form;
a capacitor configured to store the driving voltage, one terminal of the capacitor being connected to the power line, and the other terminal of the capacitor being connected between gate electrodes of the first and second transistors; and
at least two switching transistors configured to equally respond to a selection signal supplied through a selection line and form the same discharge path, so that the power voltage supplied through the power line is sunk to a constant current unit and the driving voltage is stored in the capacitor.

2. The liquid crystal display of claim 1, wherein the at least two switching transistors include:
a first switching transistor having a gate electrode connected to the selection line, a first electrode connected to the gate electrodes of the first and second transistors, and a second electrode connected to a first node connected to the constant current unit; and
a second switching transistor having a gate electrode connected to the selection line, a first electrode connected to a second electrode of the second transistor, and a second electrode connected to the first node.

3. The liquid crystal display of claim 2, wherein the first transistor has the gate electrode connected to the other terminal of the capacitor, a first electrode connected to the power line, and a second electrode connected to an anode electrode of the light emitting element,
wherein the second transistor has the gate electrode connected to the other terminal of the capacitor, a first electrode connected the to the power line, and a second electrode connected to the first electrode of the second switching transistor.

4. The liquid crystal display of claim 1, wherein the at least two switching transistors are NMOS transistors.

5. The liquid crystal display of claim 1, wherein the first and second transistors are PMOS transistors.

6. The liquid crystal display of claim 1, wherein the constant current unit includes a control transistor configured to sink the power voltage supplied through the power line in response to a data signal received from the outside.

7. The liquid crystal display of claim 1, comprising a plurality of light emitting elements, so that the backlight unit provides light to a lower part of the liquid crystal display panel.

8. The liquid crystal display of claim 7, wherein the plurality of light emitting elements are positioned on the plane to be spaced apart from one another at a constant distance.

9. A backlight unit comprising:
a light source unit including a light emitting element emitting light by the first transistor that generates a power voltage supplied through a power line as a driving current based on a driving voltage supplied to a gate electrode of the first transistor;
a second transistor connected to the first transistor in a current mirror form;
a capacitor configured to store the driving voltage, one terminal of the capacitor being connected to the power line, and the other terminal of the capacitor being connected between gate electrodes of the first and second transistors; and
at least two switching transistors configured to equally respond to a selection signal supplied through a selection line and form the same discharge path, so that the power voltage supplied through the power line is sunk to a constant current unit and the driving voltage is stored in the capacitor.

10. The backlight unit of claim 9, wherein the at least two switching transistors include:
a first switching transistor having a gate electrode connected to the selection line, a first electrode connected to the gate electrodes of the first and second transistors, and a second electrode connected to a first node connected to the constant current unit; and
a second switching transistor having a gate electrode connected to the selection line, a first electrode connected to a second electrode of the second transistor, and a second electrode connected to the first node.

11. The backlight unit of claim 10, wherein the first transistor has the gate electrode connected to the other terminal of the capacitor, a first electrode connected to the power line, and a second electrode connected to an anode electrode of the light emitting element,
wherein the second transistor has the gate electrode connected to the other terminal of the capacitor, a first electrode connected the to the power line, and a second electrode connected to the first electrode of the second switching transistor.

12. The backlight unit of claim 9, wherein the at least two switching transistors are NMOS transistors.

13. The backlight unit of claim 9, wherein the first and second transistors are PMOS transistors.

14. The backlight unit of claim 9, wherein the constant current unit includes a control transistor configured to sink the power voltage supplied through the power line in response to a data signal received from the outside.

15. The backlight unit of claim 9, comprising a plurality of the light emitting elements.

16. The backlight unit of claim 15, wherein the plurality of light emitting elements are positioned on the plane to be spaced apart from one another at a constant.

* * * * *